(12) United States Patent
Derule

(10) Patent No.: US 10,500,620 B2
(45) Date of Patent: Dec. 10, 2019

(54) METHOD FOR MANUFACTURING PARTS WITH A LOW WAVINESS FROM AN ELECTROGALVANIZED METAL SHEET, CORRESPONDING PART AND VEHICLE

(71) Applicant: ArcelorMittal, Luxembourg (LU)

(72) Inventor: Hervé Derule, Montoy Flanville (FR)

(73) Assignee: ARCELORMITTAL, Luxembourg (LU)

( * ) Notice: Subject to any disclaimer, the term of this patent is extended or adjusted under 35 U.S.C. 154(b) by 431 days.

(21) Appl. No.: 15/115,231

(22) PCT Filed: Jan. 30, 2014

(86) PCT No.: PCT/IB2014/058666
§ 371 (c)(1),
(2) Date: Jul. 28, 2016

(87) PCT Pub. No.: WO2015/114405
PCT Pub. Date: Aug. 6, 2015

(65) Prior Publication Data
US 2016/0339491 A1    Nov. 24, 2016

(51) Int. Cl.
*C25D 5/34*    (2006.01)
*C25D 5/48*    (2006.01)
(Continued)

(52) U.S. Cl.
CPC .......... *B21B 27/005* (2013.01); *C21D 8/0236* (2013.01); *C21D 8/0273* (2013.01);
(Continued)

(58) Field of Classification Search
CPC ............... C25D 5/34; C25D 5/36; C25D 5/48
(Continued)

(56) References Cited

U.S. PATENT DOCUMENTS 1,656,892 A * 1/1928 Shover ................... B23K 20/04
                                                      29/17.3
5,789,066 A * 8/1998 De Mare ................. B21B 1/227
                                                      29/17.1
(Continued)

FOREIGN PATENT DOCUMENTS

CA    2228772 A1    9/1998
CN    102716905 A   10/2012
(Continued)

OTHER PUBLICATIONS

Morita et al., Development of Galvannealed Steel Sheet with Fe—Zn Electroplated Layer for Automotive Bodies, Automotive Event: 1989 SAE Automotive Corrosion and Prevention Conference and Exposition, Technical Paper 892563 (Dec. 1, 1989), pp. 89-97. (Year: 1989).*

(Continued)

Primary Examiner — Edna Wong
(74) Attorney, Agent, or Firm — Davidson, Davidson & Kappel, LLC

(57) ABSTRACT

A method for manufacturing parts is provided. The method includes cold rolling a substrate with work cylinders whose work surface has a roughness $Ra_{2.5}$ of less than or equal to 3.6 µm, depositing the metal coating on at least one face of the annealed substrate by electrodeposition to form the metal sheet and deforming the cut metal sheet to form the parts. The outer surface of the metal coating has a waviness $Wa_{0.8}$ of less than or equal to 0.5 µm after the deformation step. A part and vehicle are also provided.

13 Claims, 1 Drawing Sheet

(51) Int. Cl.
| | |
|---|---|
| C25D 5/52 | (2006.01) |
| B21B 27/00 | (2006.01) |
| C23C 2/06 | (2006.01) |
| C23C 2/40 | (2006.01) |
| C23C 2/26 | (2006.01) |
| C21D 8/02 | (2006.01) |
| C21D 9/46 | (2006.01) |
| C25D 5/36 | (2006.01) |
| C25D 13/22 | (2006.01) |
| B21B 1/22 | (2006.01) |

(52) U.S. Cl.
CPC .............. *C21D 9/46* (2013.01); *C23C 2/06* (2013.01); *C23C 2/26* (2013.01); *C23C 2/40* (2013.01); *C25D 5/36* (2013.01); *C25D 5/48* (2013.01); *C25D 13/22* (2013.01); *B21B 2001/221* (2013.01); *B21B 2001/228* (2013.01); *B21B 2267/10* (2013.01)

(58) Field of Classification Search
USPC ............... 205/205, 206, 207, 220, 222, 224
See application file for complete search history.

(56) References Cited

U.S. PATENT DOCUMENTS

| | | | |
|---|---|---|---|
| 8,715,427 B2 | 5/2014 | Vandeputte et al. | |
| 9,200,355 B2 | 12/2015 | Scott et al. | |
| 2011/0111255 A1* | 5/2011 | Diez | C23C 2/06 428/658 |
| 2011/0165430 A1 | 7/2011 | Hesse et al. | |
| 2015/0292072 A1* | 10/2015 | Mataigne | C23C 2/06 428/659 |

FOREIGN PATENT DOCUMENTS

| | | |
|---|---|---|
| CN | 102764789 A | 11/2012 |
| CN | 103469071 A | 12/2013 |
| EP | 0240223 A2 | 10/1987 |
| EP | 0694620 A1 | 1/1996 |
| EP | 0863222 A1 | 9/1998 |
| JP | S59104201 A | 6/1984 |
| JP | S62224405 A | 10/1987 |
| JP | S63132728 A | 6/1988 |
| JP | S63299802 A | 12/1988 |
| JP | H0195804 A | 4/1989 |
| JP | H04285149 A | 10/1992 |
| JP | H0515901 A | 1/1993 |
| JP | H0675728 B2 | 9/1994 |
| JP | H078362 B2 | 2/1995 |
| JP | H0790243 A | 4/1995 |
| JP | H07136701 A | 5/1995 |
| JP | H08132103 A | 5/1996 |
| JP | 2520061 B2 | 7/1996 |
| JP | H08174007 A | 7/1996 |
| JP | H09502661 A | 3/1997 |
| JP | 2000094011 A | 4/2000 |
| JP | 2006061952 A | 3/2006 |
| JP | 2006061953 A | 3/2006 |
| JP | 5131844 B2 | 1/2013 |
| JP | 5677289 B2 | 2/2015 |
| RU | 2318911 C2 | 3/2008 |
| RU | 2009104474 A | 8/2010 |
| RU | 2418094 C2 | 5/2011 |
| WO | 9507774 A | 3/1995 |
| WO | 9507775 A1 | 3/1995 |

OTHER PUBLICATIONS

English Abstract of JPS62224405 (Oct. 2, 1987).
English Abstract of JPH09502661 (Mar. 18, 1997).
English Abstract of JP2006061952 (Mar. 9, 2006).
English Absract of JP2006061953 (Mar. 9, 2006).
EPO Machine Translation of JP59104201 (Jun. 16, 1984).
EPO Machine Translation of JP04285149 (Oct. 9, 1992).
EPO Machine Translation of JPS63299802 (Dec. 7, 1988).
Declaration re EP 3 102 348 of Dr. Robert Yanik, Sep. 27, 2018, see English translation.
Declaration re EP 3 102 348 of Friedhelm Macherey, Sep. 21, 2018, see English translation.
SEP 1941, first edition—Measurement of the waviness characteristic value Wsa (1-5) on cold rolled metallic flat products—Stahl-Eisen Pruefblaetter (SEP) des Stahlinstituts VDEh, May 2012.
EUR 25877—Development of a waviness measurement for coated products, European Commission, final report 2013.
Kurzynski, "Erarbeitung einer Normvorlage zur einheitlichen Bewertung des Einflusses der Welligkeit in der Feinblechoberflache auf die Ausbildung der Decklackverlaufstruktur (Wave Norm)," VDEh-Betriebsforschungsinstitute GmbH, Jun. 2015, see English translation.
Examination Report O 181478, Technische Universitaet Darmstadt, dated Sep. 14, 2018, 3 parts.
Tsunoyama et al.:"Effect of Sheet Surface Roughness on Clarity of Painted Sheet Steel," ISIJ, 1989.
Thirion: "Ultragal: A new generation of coated steels," Arcelor Auto, Arcelor Group, Symposium Cannes Jun. 2005.
"Stahlfeinbleche fuer den Automobilbau," Die Bibliothek der Technik 202, ThyssenKrupp Stahl, 2000, see English translation ("Thin Steel Sheets for Automotive Construction").
Cardozo et al.:"Effect of the annealing conditions on the microstructure and mechanical properties of a 0.04%C Al killed steel," Materials Science Forum vols. 539-543 (2007).
Kurzynski et al.:"Influences of the electro galvanizing process on the surface topography alterations (ELOTOP)," EUR 27777 EN—European Commission, date of publication Apr. 1, 2016.
Kochneva et al.:"Cold rolling on textured rollers to obtain regulated surface roughness," Steel in translation, 2011, vol. 41, No. 8, pp. 677-679, 2011.
Gorbunov et al.:"Regulating the surface mocrotopography of galvanized sheet for auto-body components," Steel in translation, 2012, vol. 42, No. 2, pp. 157-160, 2012.
Kessler:"Neuartige Blechverzinkung bringt Automobillack auf Hochglanz," Oberflaechentechnik, Blechnet 5 2013. see English translation.
Deutscher et al: "Characterising the surface waviness of hot dip galvanised steel sheets for optical high-quality paintability (Carsteel)," EUR 23854 EN—European Commission, 2009.
Hamada et al.:"Surface topography and appearance of electrogalvanized steel," Tetsu-to-Hagane, vol. 90 issue 5, pp. 244-249, 2004.
Wilhelm Karner et al.:"Electro Galvanizing—There is life in the old dog yet," Galvatech in Genua, May 2011.
Cai et al:"Effect of Surface Property on the Formability of Electrogalvanized Steel Sheet," Automotive Applications 261, Sep. 2013.
Hoffmann et al:"Handbuch Umformen," Edition / Handbuch der Fertigungstechnik, 2012, see English translation.
Maillard:"Découpage des tôles à la presse," Jul. 10, 2009, downloaded from the Internet at https://www.techniques-ingenieur.fr/base-documentaire/mecanique-th7/mise-en-forme-des-metaux-en-feuilles-42191210/decoupage-des-toles-a-la-presse-bm7500/, see machine translation.
Loeffler—Dekra Automobil GmbH Gutachten, Nr. 302/1900 UP 16-1818779935, Reference No. 02555 2016-07-14, Dec. 15, 2016, see partial translation.
Dekra—Assessment of the originality of two vehicle roofs (VW Golf and VW Polo) as part of sampling, Order No. 453-8500027613 dated Aug. 23, 2018 and supporting documents, see partial translation.
Notary Karl-Heinz Dasbach's minute of facts of Aug. 20, 2018, No. 496 of register for 2018, see translation.
ZE—Opposition to EP 3102348 Using the strategy of prior public use—thyssenkrupp Steel Europe AG, Aug. 31, 2018, see translation.
Examination of two vehicles as part of patent opposition proceedings with monitoring by the external supplier Lloyd's Register.
Factual Report of Lloyd's Register for ThyssenKrupp Steel Europe AG, client order No. 453-8200028118, Sep. 3, 2018.

(56) References Cited

OTHER PUBLICATIONS

Summary of results Comparison of Wa0.8 Measurement before Painting and after Paint Striping, thyssenkrupp Steel Europe AG, see translation.
METIS 2018, Results of analysis, Paint stripped & fephosphated-measurement direction longitudinal, labeled OV17, see English translation.
Examination Report O 181478, Technische Universitaet Darmstadt, Sep. 14, 2018.
Proceeding of 2004 China International Congress on the Technical Seminars of Steel, Jun. 1, 2004, M.Righini et al., Tin Plate Production Line.

* cited by examiner

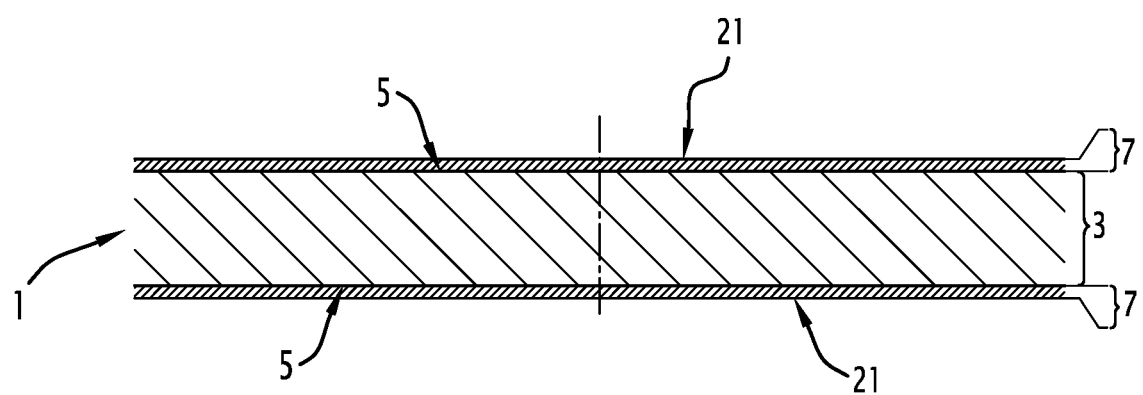

METHOD FOR MANUFACTURING PARTS WITH A LOW WAVINESS FROM AN ELECTROGALVANIZED METAL SHEET, CORRESPONDING PART AND VEHICLE

The present invention relates to a method for manufacturing a metal sheet comprising a substrate, at least one face of which is covered by a zinc-based metal coating.

BACKGROUND

Such a metal sheet is more particularly designed to manufacture body parts for a land-based motorized vehicle, such as a motor vehicle.

The metal sheet is then cut and deformed to produce parts that are assembled to form the body or shell.

That shell is next coated with a film of paint (or paint system), which provides a good surface appearance and, with the zinc-based metal coating, helps protect against corrosion.

Zinc-based coatings for metal sheets have what is referred to as a waviness of their outer surfaces, which currently can only be offset by significant paint thicknesses, failing which there may be an "orange peel" appearance that is unacceptable for body parts.

The waviness W of the outer surface of a coating is a gentle, pseudo-periodic geometric irregularity, with a relatively long wavelength (0.8 to 10 mm), that differs from the roughness R, which corresponds to geometric irregularities with short wavelengths.

BRIEF SUMMARY

In the present invention, the arithmetic mean Wa of the waviness profile, expressed in μm, has been chosen to characterize the waviness of the outer surface of a metal sheet coating, and the waviness measurements have been conducted in accordance with standard SEP 1941, $1^{st}$ edition dated May 2012, in particular with a cutoff threshold of 0.8 mm. These measurements are deemed compliant with this standard by $Wa_{0.8}$.

A decrease in the waviness $Wa_{0.8}$ may make it possible to reduce the thickness of the paint film used to achieve a given painted appearance quality or, at a constant paint film thickness, to improve the quality of the paint appearance.

An object of the present invention provides a method for manufacturing parts by cutting and forming a metal sheet, the metal sheet comprising a substrate whereof at least one face has been coated with a zinc-based metal coating, the outer surface of the metal coating having a reduced waviness $Wa_{0.8}$ after deformation.

The present invention provides a method for manufacturing parts made from a metal sheet comprising a substrate whereof at least one face is coated with a zinc-based metal coating, the method comprising at least the following steps:
 providing the substrate,
 cold rolling the substrate, during which step at least the last cold rolling pass is done with work cylinders whose work surface have a roughness $Ra_{2.5}$ of less than or equal to 3.6 μm,
  recrystallization annealing of the cold rolled substrate,
  skin-pass of the annealed substrate,
  deposition of the metal coating, on at least one face of the annealed substrate, by electrodeposition to form the metal sheet,
  cutting the metal sheet, and
  deforming the cut metal sheet to form the parts, the outer surface of the metal coating having a waviness $Wa_{0.8}$ of less than or equal to 0.5 μm after the deformation step.

The method may also comprise the following features, considered alone or in combination:
 at least the last cold rolling pass is carried out with work cylinders whose work surfaces have a roughness $Ra_{2.5}$ of less than or equal to 3.3 μm;
 at least the last cold rolling pass is carried out with work cylinders whose work surfaces have a roughness $Ra_{2.5}$ of less than or equal to 3.2 μm;
 at least the last cold rolling pass is carried out with straightened and non-etched work cylinders whose work surfaces have a roughness $Ra_{2.5}$ of less than or equal to 0.5 μm;
 at least the last cold rolling pass is carried out with straightened and non-etched work cylinders whose work surfaces have a roughness $Ra_{2.5}$ of less than or equal to 0.4 μm;
 at least the last cold rolling pass is carried out with work cylinders whose work surfaces are either not etched, or stochastically etched;
 the skin-pass step is performed with EDT work cylinders whose work surfaces have a roughness $Ra_{2.5}$ comprised between 1.65 and 2.95 μm;
 the skin-pass step is performed with EDT work cylinders whose work surfaces have a roughness $Ra_{2.5}$ comprised between 1.65 and 2.30 μm;
 the method comprising a step for painting the deformed parts;
 the outer surface of the metal coating has a waviness $Wa_{0.8}$ of less than or equal to 0.45 μm after the deformation step;
 the outer surface of the metal coating has a waviness $Wa_{0.8}$ of less than or equal to 0.40 μm after the deformation step; and
 the outer surface of the metal coating has a waviness $Wa_{0.8}$ of less than or equal to 0.35 μm after the deformation step.

The present invention also provides a part which may be obtained using the method as defined above, wherein the outer surface of the metal coating has a waviness $Wa_{0.8}$ of less than or equal to 0.50 μm.

The part may also comprise the following features, considered alone or in combination:
 the outer surface of the metal coating has a waviness $Wa_{0.8}$ of less than or equal to 0.45 μm;
 the outer surface of the metal coating has a waviness $Wa_{0.8}$ of less than or equal to 0.40 μm;
 the outer surface of the metal coating has a waviness $Wa_{0.8}$ of less than or equal to 0.35 μm; and
 the part further comprises a paint film on the metal coating.

The invention also provides a motorized land-based vehicle comprising a body, the body comprising a part as defined above.

BRIEF DESCRIPTION OF THE DRAWING

The invention will be illustrated by examples provided for informational purposes, and non-limitingly, in reference to the appended FIGURE, which is a diagrammatic sectional view illustrating the structure of a metal sheet according to the invention.

DETAILED DESCRIPTION

The sheet 1 comprises a steel substrate 3, each of the two faces 5 of which are covered by a metal coating 7.

It will be noted that the relative thicknesses of the substrate 3 and the different layers covering it has not been respected in FIG. 1 in order to facilitate the illustration.

The coatings 7 present on the two faces 5 are generally similar, and only one will be described in more detail below. As an alternative, only one of the faces 5 has a coating 7.

The coating 7 generally has a thickness smaller than or equal to 25 μm and aims to protect the substrate 3 from corrosion.

The coating 7 is a zinc-based coating. It may for example use zinc, or a zinc alloy, such as zinc-nickel or zinc-iron or zinc-cobalt, or a zinc-polymer composite.

The following method may for example be used to manufacture the metal sheet 1.

A substrate 3 in the form of a strip is used, for example obtained by hot rolling.

The substrate 3 first undergoes a cold rolling step.

Preferably, for the cold rolling, one begins by rolling the substrate 3 with a reduction rate generally comprised between 60 and 85%, so as to obtain a substrate 3 with a thickness for example comprised between 0.2 and 2 mm.

Care will be taken so that at least the last cold rolling pass is done with work cylinders with a reduced thickness, i.e., the work surfaces of which have a thickness $Ra_{2.5}$, i.e., measured with a cutoff threshold at 2.5 mm, of less than or equal to 3.6 μm, and preferably less than or equal to 3.3 μm or even 3.2 μm.

It will be recalled that the work cylinders are the cylinders of the roller in direct contact with the substrate 3 to deform it. The term "work surface" designates their surfaces in contact with the substrate 3.

The work cylinders with reduced roughness are present at least in the last cage(s) of the roller in the advance direction of the substrate 3 in the roller.

Preferably, the work surfaces are not etched, or are etched stochastically, i.e., using a method creating a stochastic texture. Such a method may for example be an EDT (Electro Discharge Texturing) method. EBT (Electron Beam Texturing) methods are ruled out in this case, since they produce a non-stochastic texture.

In one alternative, the work cylinders are so-called "smooth" work cylinders, i.e., straightened and non-etched cylinders, the work surfaces of which have a roughness $Ra_{2.5}$ smaller than or equal to 0.5 μm, or even 0.4 μm.

The work cylinders with reduced roughness positioned on either side of the substrate 3 will preferably have been made using the same method and will therefore have the same characteristics.

The cold rolled substrate 3 can next undergo annealing carried out conventionally in an annealing furnace under an appropriate atmosphere, in order to recrystallize it after the work hardening it has undergone during the cold rolling operation.

The recrystallization annealing also makes it possible to activate the faces 5 of the substrate 3 in order to favor the chemical reactions necessary for the subsequent electrodeposition operation.

Depending on the grade of the steel, the recrystallization annealing is done at a temperature comprised between 650 and 900° C. for the time necessary to recrystallize the steel and activate faces 5.

The substrate 3 next undergoes a skin-pass operation to give the faces 5 a texture facilitating subsequent shaping of the metal sheet 1.

In fact, the skin-pass operation makes it possible to transfer a sufficient roughness to the faces 5, and therefore the outer surfaces 21 of the coatings 7 of the metal sheet 1, so that it can subsequently be shaped under good conditions, while favoring good retention of the oil applied to the metal sheet 1 before it is shaped.

The elongation rate of the substrate 3 during the skin-pass operation is generally comprised between 0.5 and 2%.

In one alternative, the skin-pass operation will be carried out with EDT work cylinders whose work surfaces have a roughness $Ra_{2.5}$ comprised between 1.65 and 2.95 μm, preferably between 1.65 and 2.30 μm.

The coatings 7 are next made by electrodeposition. To that end, the substrate 3 passes through an electrolyte bath.

The progression speed of the substrate 3 in the electrolyte bath is generally comprised between 20 and 200 m/mn.

The electrolyte is for example an aqueous acetyl electrolyte of the sulfate, chloride or chloride-sulfate mixture type, suitable for electrolytic deposition on the substrate 3 of either a layer of zinc, or a layer of zinc alloy, or a layer of zinc-polymer composite.

Thus, in order to deposit a zinc coating on the substrate 3, it is possible to use a chloride-based electrolyte bath comprising 50 to 150 g/l of zinc in the form of zinc chloride ($ZnCl_2$), 250 to 400 g/l of potassium chloride (KCl) and having a pH comprised between 4 and 5. The bath can also comprise additives, for example grain refiners with a concentration comprised between 1 and 1.5 m/l. In order to deposit the layer of zinc on the substrate 3, the current density is preferably adjusted to a value comprised between 30 and 150 $A/dm^2$, and the temperature of the bath is preferably adjusted to a value comprised between 40 and 80° C., and preferably below 60° C. to limit evaporation of the bath.

It is also possible to use a sulfate-based electrolyte bath comprising 50 to 150 g/l zinc in the form of zinc sulfate ($ZnSO_4$), and having a pH below 5. The bath can also comprise additives, for example $NaCO_3$. Preferably, the current density is adjusted to a value comprised between 10 and 150 $A/dm^2$, and the temperature of the bath to a value comprised between 40 and 80° C., preferably below 60° C. to limit the evaporation of the bath.

If one wishes to deposit a zinc alloy coating, such as zinc-nickel, zinc-iron or zinc-cobalt, nickel, iron or cobalt ions are added to the sulfate-, chloride- or chloride-sulfate mixture-based electrolyte bath previously described.

Likewise, to deposit a zinc-polymer composite coating, 0.1 to 2 wt % of a polymer, for example polyethylene glycol or polyacrylamide, is added to the sulfate-, chloride- or sulfate-chloride mixture-based electrolyte bath previously described. The obtained composite coating imparts excellent corrosion resistance and also makes it possible to avoid the toxic chromating or phosphating treatments necessary for the paint to catch.

The surfaces 21 of the coatings 7 will preferably have references $Ra_{2.5}$ comprised between 0.9 and 1.8 μm, and still more preferably between 0.9 and 1.5 μm.

The metal sheet 1 thus obtained can next be cut, then shaped, for example by stamping, bending or profiling, to form parts that can next be painted to form a paint film (or paint system), not shown, on each coating 7.

In the event of parts for household appliances, the paint films may also be subject to annealing by physical and/or chemical means, known in themselves.

To that end, the painted part may be passed through a hot air or induction oven, or under UV lamps or under a device diffusing electron beams.

After deformation, the outer surfaces 21 of the coatings 7 of the part have a waviness $Wa_{0.8}$ of less than or equal to 0.50

µm, preferably less than or equal to 0.45 µm, still more preferably less than or equal to 0.40 µm, or even 0.35 µm.

The use of work cylinders with a reduced roughness $Ra_{2.5}$ at least for the last cold rolling pass makes it possible to better control the waviness $Wa_{0.8}$ of the metal sheet 1 subsequently obtained by coating the substrate 3 on the one hand, and of the parts that can be produced by cutting and deforming the metal sheet 1 on the other hand.

In particular, such cold rolling makes it possible to reduce the waviness $Wa_{0.8}$ relative to rolling only using cylinders with a higher roughness.

Thus, the use of work cylinders with a roughness $Ra_{2.5}$ of less than or equal to 3.6 µm makes it possible to achieve a waviness $Wa_{0.8}$ of less than or equal to 0.50 µm after the coating deposition step or after any deformation step.

The use of work cylinders with a roughness $Ra_{2.5}$ of less than or equal to 3.3 µm, or even 3.2 µm, for example makes it possible to achieve a waviness $Wa_{0.8}$ of less than or equal to 0.45 µm after the coating deposition step or after any deformation step.

The use of smooth work cylinders with a roughness $Ra_{2.5}$ of less than or equal to 0.5 µm for example makes it possible to achieve a waviness $Wa_{0.8}$ of less than or equal to 0.40 µm, or even 0.35 µm after the coating deposition step or after any deformation step.

For automobile applications, after phosphating, each part is soaked in a cataphoresis bath, and a primer layer, a base paint layer, and optionally a finishing varnish layer are successively applied.

Before applying the cataphoresis layer on the part, the latter is first degreased, then phosphated so as to ensure adherence of the cataphoresis.

The cataphoresis layer then provides additional corrosion protection for the part. The primer layer, generally applied using a gun, prepares the final appearance of the part and protects it from grit and UV rays. The base paint layer gives the part its final color and appearance. The layer of varnish gives the surface of the part good mechanical strength, the ability to withstand aggressive chemical agents and a good surface appearance.

Generally, the weight of the phosphating layer is comprised between 1.5 and 5 g/m².

The paint films used to protect and guarantee an optical surface appearance for the parts for example comprise a cataphoresis layer with a thickness of 15 to 25 µm, a primer layer with a thickness of 35 to 45 µm, and a base paint layer with a thickness of 40 to 50 µm.

In the event the paint film layers further comprise a varnish layer, the thicknesses of the different paint layers are generally as follows:

cataphoresis layer: between 15 and 25 µm, preferably less than 20 µm, primer layer: less than 45 µm, base paint layer: less than 20 µm, and varnish layer: less than 55 µm.

The paint films may also not comprise a cataphoresis layer, and only comprise a primer layer and a base paint layer, and optionally a varnish layer.

Preferably, the total thickness of the paint films will be less than 120 µm, or even 100 µm.

The invention will now be illustrated by trials provided for information and non-limitingly.

The trials done seek to show the positive influence of cold rolling done with work cylinders with a reduced roughness $Ra_{2.5}$, relative to rolling done with cylinders whose work surface has a greater roughness.

To that end, grade DC-06 steel substrates undergo cold rolling to reach a thickness of 0.8 mm, using either EDT etched work cylinders, the work surfaces of which have roughnesses $Ra_{2.5}$ of 3.1 µm, 3.5 µm and 3.75 µm, or smooth work cylinders whose work surfaces have a roughness $Ra_{2.5}$ of 0.3 µm.

After recrystallization annealing at 720° C., the substrates 3 next undergo a same skin-pass operation done with EDT etched work cylinders, the work surfaces of which have a roughness $Ra_{2.5}$ of 1.85 µm.

The substrates 3 are next coated with zinc by electrodeposition in a sulfate-based electrolyte bath. The metal sheets thus obtained are cut and shaped by 3.5% equi-biaxial deformation using a Marciniak tool.

The waviness $Wa_{0.8}$ and roughness $Ra_{2.5}$ values of the outer surfaces 21 of the coatings 7 are noted at the end of the electrodeposition step (EG) and the deformation step (DEF).

The measurement results for $Wa_{0.8}$ and $Ra_{2.5}$ are provided in table I. Trials 2 to 4 correspond to different embodiments of the invention and are identified by asterisks.

TABLE I

| Trials | $Ra_{2.5}$ (µm) cylinders for LAF work | $Wa_{0.8}$ (µm) after EG | $Ra_{2.5}$ (µm) after EG | $Wa_{0.8}$ (µm) after DEF | $Ra_{2.5}$ (µm) after DEF | Difference $Wa_{0.8}$ after DEF and after EG |
|---|---|---|---|---|---|---|
| 1 | 3.75 | 0.47 | 1.12 | 0.55 | 1.24 | +17% |
| 2 | 3.5* | 0.49 | 1.39 | 0.47 | 1.27 | −4.1% |
| 3 | 3.1* | 0.36 | 1.27 | 0.36 | 0.96 | 0% |
| 4 | 0.3* | 0.40 | 1.05 | 0.35 | 0.86 | −13% |

It is in particular observed that the waviness $Wa_{0.8}$ after deformation of the metal sheets according to the invention is close to or below the waviness level before deformation. This effect is particularly clear for trials 2 and 4.

What is claimed is:

1. A method for manufacturing parts made from a metal sheet comprising the steps of:

providing a substrate;

cold rolling the substrate, at least a last cold rolling pass being done with work cylinders whose work surface have a roughness $Ra_{2.5}$ of less than or equal to 3.6 µm;

recrystallization annealing of the cold rolled substrate;

skin-pass rolling the annealed substrate;

depositing a zinc-based metal coating on at least one face of the substrate by electrodeposition to form a metal sheet;

cutting the metal sheet; and deforming the cut metal sheet to form parts, an outer surface of the metal coating having a waviness $Wa_{0.8}$ of less than or equal to 0.5 µm after the deformation step.

2. The method according to claim 1, wherein at least the last cold rolling pass is carried out with work cylinders whose work surfaces have a roughness $Ra_{2.5}$ of less than or equal to 3.3 μm.

3. The method according to claim 2, wherein at least the last cold rolling pass is carried out with work cylinders whose work surfaces have a roughness $Ra_{2.5}$ of less than or equal to 3.2 μm.

4. The method according to claim 3, wherein at least the last cold rolling pass is carried out with straightened and non-etched work cylinders whose work surfaces have a roughness $Ra_{2.5}$ of less than or equal to 0.5 μm.

5. The method according to claim 4, wherein at least the last cold rolling pass is carried out with straightened and non-etched work cylinders whose work surfaces have a roughness $Ra_{2.5}$ of less than or equal to 0.4 μm.

6. The method according to claim 1, wherein at least the last cold rolling pass is carried out with work cylinders whose work surfaces are not etched.

7. The method according to claim 1, wherein at least the last cold rolling pass is carried out with work cylinders whose work surfaces are stochastically etched.

8. The method according to claim 1, wherein the step of skin-pass rolling is performed with electro discharge texturing work cylinders whose work surfaces have a roughness $Ra_{2.5}$ of from 1.65 to 2.95 μm.

9. The method according to claim 8, wherein the step of skin-pass rolling is performed with electro discharge texturing work cylinders whose work surfaces have a roughness $Ra_{2.5}$ of from 1.65 to 2.30 μm.

10. The method according to claim 1, further comprising a step of:
painting the deformed parts.

11. The method according to claim 1, wherein the outer surface of the metal coating has a waviness $Wa_{0.8}$ of less than or equal to 0.45 μm after the deformation step.

12. The method according to claim 11, wherein the outer surface of the metal coating has a waviness $Wa_{0.8}$ of less than or equal to 0.40 μm after the deformation step.

13. The method according to claim 12, wherein the outer surface of the metal coating has a waviness $Wa_{0.8}$ of less than or equal to 0.35 μm after the deformation step.

* * * * *